United States Patent
Brennan

(10) Patent No.: US 9,228,853 B1
(45) Date of Patent: Jan. 5, 2016

(54) METHOD OF COMPUTING QUANTITY OF UNACCOUNTED FOR WATER IN WATER DISTRIBUTION

(75) Inventor: William J. Brennan, Montgomery, AL (US)

(73) Assignee: NEPTUNE TECHNOLOGY GROUP INC., Tallassee, AL (US)

( * ) Notice: Subject to any disclaimer, the term of this patent is extended or adjusted under 35 U.S.C. 154(b) by 0 days.

(21) Appl. No.: 13/532,251

(22) Filed: Jun. 25, 2012

(51) Int. Cl.
  *G01D 4/00* (2006.01)

(52) U.S. Cl.
  CPC ............... *G01D 4/002* (2013.01); *G01D 4/006* (2013.01); *Y02B 90/24* (2013.01)

(58) Field of Classification Search
  CPC .... Y02B 90/24; Y02B 90/241; Y02B 90/245; Y02B 90/246; Y02B 90/247; G01D 4/002; G01D 4/004; G01D 4/006; G01D 4/008; H04B 2203/5433
  USPC .................. 340/870.01, 870.02, 870.07, 605; 702/33, 35, 36, 45, 50, 51, 127; 705/400, 412
  See application file for complete search history.

(56) References Cited

U.S. PATENT DOCUMENTS

| | | | |
|---|---|---|---|
| 4,437,336 A | 3/1984 | Abe | |
| 4,888,706 A * | 12/1989 | Rush et al. | 700/283 |
| 5,243,338 A | 9/1993 | Brennan | |
| 5,574,229 A | 11/1996 | Castillo | |
| 6,653,945 B2 * | 11/2003 | Johnson et al. | 340/870.02 |
| 6,687,637 B2 * | 2/2004 | Garabedian | 702/107 |
| 6,856,257 B1 * | 2/2005 | Van Heteren | 340/870.03 |
| 6,860,288 B2 | 3/2005 | Uhler | |
| 6,957,157 B2 | 10/2005 | Lander | |
| 7,124,036 B2 | 10/2006 | Rigby | |
| 7,218,237 B2 | 5/2007 | Kates | |
| 7,228,726 B2 * | 6/2007 | Kates | 73/40 |
| 7,304,587 B2 | 12/2007 | Boaz | |
| 7,317,404 B2 | 1/2008 | Cumeralto | |
| 7,360,413 B2 | 4/2008 | Jeffries | |
| 7,504,964 B2 | 3/2009 | Bianchi et al. | |
| 7,596,458 B2 | 9/2009 | Lander | |
| 2002/0135493 A1 | 9/2002 | Moreno | |
| 2003/0216971 A1 * | 11/2003 | Sick et al. | 705/26 |
| 2006/0289623 A1 | 12/2006 | Oldham | |
| 2007/0103335 A1 | 5/2007 | Fitzgerald | |
| 2008/0019874 A1 | 1/2008 | Deverse | |
| 2010/0117856 A1 * | 5/2010 | Sonderegger | 340/870.02 |
| 2010/0134089 A1 * | 6/2010 | Uram et al. | 324/66 |
| 2012/0197552 A1 * | 8/2012 | Robinson et al. | 702/50 |
| 2013/0238266 A1 * | 9/2013 | Savvides et al. | 702/61 |

* cited by examiner

Primary Examiner — Hai Phan
Assistant Examiner — Franklin Balseca
(74) Attorney, Agent, or Firm — Paul Sykes; Bradley Arant Boult Cummings LLP

(57) ABSTRACT

A method of accounting for the quantity of water or other distributed resource in a distribution system utilizing automated meter reading and reporting. Missing readings are identified and estimated to allow the quantity of unaccounted for water always to be computed.

16 Claims, 3 Drawing Sheets

METHOD OF COMPUTING QUANTITY OF UNACCOUNTED FOR WATER IN WATER DISTRIBUTION

TECHNICAL FIELD

The invention relates generally to the field of metering distributed resources, such as water, gas, electricity, or chemicals.

BACKGROUND

Utilities and other entities operate distribution systems for water, gas, and electricity to deliver these resources to various consumers connected to the distribution system. Typically, each consuming entity has at least one meter measuring the amount of the resource that it is removing from the distribution system. The utility likewise measures the amount of the resource that it is supplying to the distribution system, either through supply meters or other similar means. In a perfect world, the total amount of the resource supplied should equal the amount consumed.

This, however, is not a perfect world. Utilities commonly encounter discrepancies between the amount supplied and the amount consumed in their distribution systems. These discrepancies may usually be attributable to one or more of the following factors: inaccuracies in metering devices; leaks; line breakages and known singular events such as a fire crew accessing water from a hydrant to put out a fire; and theft. The difference between the measured quantity of resource supplied and the measured quantity of resource consumed is simply referred to as "unaccounted for."

Except for known events such fires and reported line breakages, utilities traditionally have had a difficult time accurately measuring the amount of unaccounted for resources, monitoring changes in the amount over time, and therefore being able to identify the source and cause of missing resources. This is because distribution systems usually include large numbers of meters, and with meters that must be read manually, it was impractical to gather a series of readings from such a large number of meters in a short time as is necessary to accurately measure and monitor the unaccounted for resource.

More recently, metering systems have utilized wireless communications modules operatively connected to the meter itself, such that the communications module could report the meter reading electronically to a communications network. Such networks initially utilized a mobile communications device that a utility worker would use to more rapidly collect readings as he drove within range of the meters. Later, the networks include stationary receivers designed to receive messages from a designated set of meters with a certain range, or the communications modules on the meters are capable of communicating with each other and passing messages along to a module connected that is connected to a gateway to the larger network. Various network topologies and technologies exist in the prior art for transmitting meter readings from a communications module at the meter to a central data collection or processing unit. In these systems, the communications module at the meter might transmit a reading on a predetermined interval (a "bubble up" system), or the module might respond to a command to report a meter reading from the central host or a nearby receiver or collector. Such networks are known and understood by those of ordinary skill in the art and will not be discussed in further detail here. In any case, such communication systems offer the ability for near instantaneous transmission of meter readings from the meter itself back to the central host computer for compilation and analysis.

In a large distribution network, however, a significant number of readings will be missing because of meters with inoperable or unresponsive communications modules, or where the signal was otherwise blocked, corrupted, or lost in transmission. These missing readings compromise the ability to measure and monitor the amount of an unaccounted for resource, even with a wireless communications network. In addition, to determine consumption, including to measure the amount of an unaccounted for resource, the utility usually must obtain readings for a large number of meters over a specific time period, such as a 24-hour period. Many meters make readings on regular intervals determined by internal clocks, which are not necessarily synchronized with an actual time. Therefore, while a meter may make a reading on a regular interval, such as every 15 minutes, or hourly, those intervals may fall randomly on the actual clock. For example, a meter taking a reading every 15 minutes may take those readings at 11, 26, 41, and 56 minutes after the hour. Moreover, meters in a distribution system may not be synchronized with one another; so even if all are taking a reading on the same reading interval (e.g., every 15 minutes) the distribution of when those readings are made, with respect to actual time, is somewhat random. Also, the internal clocks of meters may be subject to drift in accuracy over time, such that synchronization or lack thereof, with respect to actual time, may be constantly changing. For all of these reasons, the readings taken by meters are usually out of synch with one another and with defined points on the clock (such as the top of every hour). As a result, an actual reading at the desired beginning and ending of the specified time period (such as midnight), will likely be missing for a large number of meters. With a complete set of readings for a defined time period, a utility can determine if the unaccounted for resource is due to leaks, inaccuracies in meters, or theft.

Thus, there is a need for a method and system to provide a utility or other entity a complete set of readings for each meter of interest in a large distribution system, in which some meters may be inoperable, nonresponsive, where data transmissions may be lost or corrupted, and where lack of synchronization results in readings being missing for a defined time period.

SUMMARY

Embodiments of the present invention satisfy these needs, but it should be understood that not all embodiments satisfy each need. One embodiment comprises a method of determining the amount of unaccounted-for water in a water distribution system including a multiplicity of consumption meters, where each consumption meter has a communications device for reporting readings, in which meter readings are made on defined intervals (which may be regular or variable) and reported (on a regular or pseudorandom basis). The central station, host or other receiving entity determines whether readings are missing for any meter on any reading interval or with respect to points within a defined time period. Next, an estimated reading is made for each missing reading of each meter. The water supplied to the meters over the time period is computed, and the water consumed by the meters over the time period is computed, including consumption determined from estimated readings. From these values, the quantity of unaccounted for water over the time period is determined by computing the difference between the aggregate of water supplied and the aggregate of water consumed over said time period. In another embodiment, each consumption meter includes a two-way communications module for receiving and responding to a read command to report an actual reading of the meter. The method comprises issuing over a desired time period a series of read commands to each of the meters and receiving actual meter readings from meters in response to the read commands. Then, missing readings are identified that correspond to each read command for which a responsive actual reading was not received. Estimated readings are made and the unaccounted for water is computed as described above.

BRIEF DESCRIPTION OF THE DRAWINGS

The present invention will be explained, by way of example only, with reference to certain embodiments and the attached figures, in which.

DETAILED DESCRIPTION

Embodiments of the present invention provide a method for quantifying, monitoring, and analyzing over time unaccounted for resources in a metered distribution network, in which meter readings are missing, by utilizing estimates of the missing readings so that a value for the unaccounted for resource may always be calculated. The remainder of this disclosure will use, by way of example, water and water distribution systems operated by a utility, but it should be understood that the principles and inventions disclosed are equally applicable to any distribution system and metered resource, including water, natural gas, electricity, oil, or chemicals, whether operated by a utility or other entity.

Certain aspects of embodiments of the method of the present invention are preferably implemented in software instructions to be executed by a processor in, for example, a host or other computer system. Therefore, steps and actions identified as identifying missing readings, estimating readings, and computing certain values based on various data should be understood to be performed by a processor executing instructions of a computer software program. Other aspects of embodiments of the present invention are performed by specific hardware devices described generally herein, and known in the art, such as meter interface units (to read meters) and radio receivers or transceivers (to receive readings transmitted by a meter interface unit), which may be in operable communication with computing devices referenced above.

Figure 1:
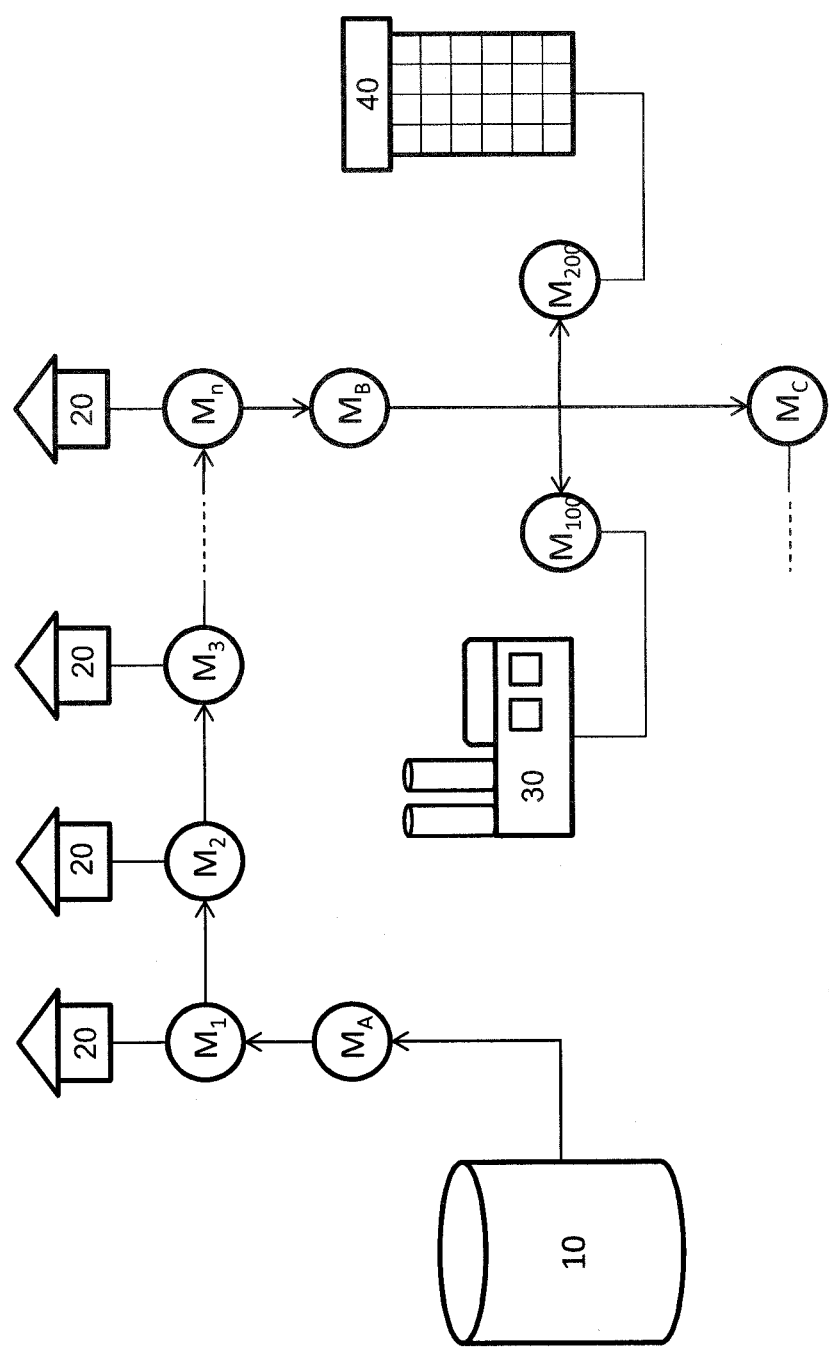
FIG. 1 is a schematic of an exemplary water distribution system.

FIG. 1 depicts a portion of an exemplary water distribution network. A utility 10 supplies water to a multiplicity of consumption points, which may include individual residences 20 in a housing subdivision, industrial customers such as factory 30 or office building 40, or any combination thereof, as well as apartments, condominiums, businesses, restaurants, and any other consumer of water. A consumption meter is typically placed at each consumption point, as shown in FIG. 1, with meters $M_1$ through $M_n$ measuring consumption at each residence 20, meter $M_{100}$ at factory 30 and $M_{200}$ at office building 40. A utility may subdivide a large system with a large number of consumers into one or more segments or subsystems, each with a subset of the consumers, in which the utility measures both the amount of the resource entering and exiting each subsystem. In the exemplary system of FIG. 1, source meters $M_A$ and $M_B$ measure the amount of water entering and leaving, respectfully, the residential subdivision represented by houses 20. Source meters $M_B$ and $M_C$ measure the amount of water entering and leaving the segment of the system supplying factory 30 and office building 40.

By taking readings of each meter, the utility can measure the consumption of each consumer in the distribution network and can track the quantity of water entering and leaving each segment of the system. It should be noted that the term "reading" is used here in its broadest sense and includes both the value of an incremental counter on a meter and a measurement of consumption. Meters typically increment a counter that is representative of water flow through the meter, and this counter is read and reported as a "reading." In order to determine consumption, an earlier reading is subtracted from a later reading to provide the amount of water that flowed though the meter between the two readings. Other meters may internally compute or report consumption values over predefined time intervals. The term "reading" should be understood to include information reported or derived from reading a meter from which consumption may be directly or indirectly determined.

By subtracting the amount of water supplied to a segment of the water system, such as the segment between source meters $M_A$ and $M_B$ (herein after segment AB), from the water consumed by consumption meters $M_1$ to $M_n$, over a given period of time, the amount of unaccounted for water should be able to be determined. Meter readings should be made within a defined time period to properly determine the unaccounted for water. In a typical distribution system, a utility may serve tens of thousands of consumers and have tens of thousands of meters in a portion of its system. To obtain readings of these many meters close enough in time to one another to accurately determine the quantity of unaccounted for water, it is preferable for the meters to be read electronically and the readings reported to a central data center, through one of the many network communications systems known in the art. To accomplish this, "read" or similar commands are issued electronically to the meters of interest over a defined time period in order to gather data about consumption. In response, the communications modules on the meters should take a reading from the meter and report back the actual meter reading. Alternatively, the meters may make readings on defined intervals (fixed, variable, or pseudorandom) on a continual basis, such as every one, five, or fifteen minutes, and regularly report those readings on the same or some other interval. This type system is referred to as a "bubble up" system. In some embodiments of a bubble up system, the difference between the time at which the reading was made and the time that the reading was reported could be significant and must be addressed, as is understood by those of ordinary skill in the art.

However, several things can go wrong that prevent meter readings from being reported to a central data center for analysis. The communications module on a meter may not receive a command to read the meter, or its reading may be lost or corrupted in transmission. The battery may die in the communications module, or the module may otherwise be inoperative to read the meter or transmit the reading. In a system with 30,000 meters, even a 99% success rate means 1% or 300 of the meters fail to report their readings. These nonresponsive meters may be connected to consumers of any size. Without accounting for these missing readings, the amount of unaccounted for water cannot be calculated.

In addition, the calculation of a quantity of unaccounted for water is usually performed over a defined time period, such as 24 hours, 7 days, or a 30 days. Because the internal clocks in meters that govern the time at which readings are made are not necessarily synchronized to actual time, such that the intervals occur randomly with respect to defined periods on an actual clock (such as hourly), and also because the clocks can drift over time, the reported readings will not necessarily correspond to the beginning and ending points of the defined time period. For example, if a meter is programmed to make reading every 15 minutes, its reading for midnight may be before or after midnight by as much as 7.5 minutes. When such variation is considered across a system comprising thousands of meters, relatively few of the meters will report a reading at exactly midnight and most readings will not be synchronized with another. Therefore, readings at the beginning and ending points of the defined time period are effectively missing. As used herein, the term missing readings shall include readings that are lost in transmission, corrupted, or result from an inoperable, defective, or nonresponsive meter, as well as readings desired for a specific point in time that are not received because a meter's reading interval does not coincide with that point in time (i.e., is not synchronized with a specific actual time).

In one embodiment of the present invention, the missing meter readings are estimated in order to be able to consistently quantify the volume of unaccounted for water in the system. Systems known in the art use various methodologies, network topologies, and protocols to receive readings from consumption meters. These include polling systems, in which the host communicates commands to the communications modules at the meter and receive the responsive reading back from the meter, and bubble-up systems, in which the meters regularly report readings made on a fixed time interval. Any such system could be utilized in connection with the present invention. In a polling system, the host system may issue "read" commands to a group of consumption meters for which it is desired to determine the amount of unaccounted for water loss. In some cases, the quantity of water supplied will be known by direct measurement at the utility's source. More often, however, the utility will need to read source meters that measure the amount of water that enter and leave a particular portion of a distribution system, as shown in FIG. 1. If that is the case, the system also issues read commands to the source meters at the same time. In a bubble-up system, the host regularly receives readings from consumption and source meters in the distribution network. Regardless of the system used, if a sufficient number of consumption meters are being polled, or even if a relatively small number of consumption meters is being polled repeatedly over an extended time period, or in a bubble-up system a sufficiently large number of meters are reporting their data, the host system will not receive readings from all meters for every desired time interval, or a reading for a specified point in time (e.g., midnight), for the reasons stated above.

Upon gathering the actual readings from the meters, the data is analyzed to identify missing readings. An estimated reading is determined for each missing reading. The estimated reading may be made in several ways. Readings, including historical readings, are typically stored in a database for review and analysis. Therefore, a prior actual reading for the meter at issue, which corresponds to the missing reading, may be located. The prior actual reading may be a reading at the same time on the same day of the week from the previous week, for example. If in a particular study of unaccounted for water, the consumption period was for an entire day and a day's reading was missing, then the consumption for the same day of the week the previous week, or the previous month, could be used. Alternatively, and especially where the missing reading is one resulting from lack of synchronization between a meter's reading interval and a desired specific point in time or from lack of synchronization among meters, missing readings may be estimated by using straight-line estimation if actual readings are available before and after the missing reading. The actual reading the closest in time before, and the actual reading closest in time after, the missing reading are identified. The difference between these two actual readings is computed. The difference is multiplied by the fraction of time the missing reading is between the two known readings. To determine this fraction, the time difference between the time of the missing reading and the time of the earlier reading is the numerator; the time difference between the time of the later reading and the time of the missing reading is the denominator. Other methods of estimating readings could also be used. For example, the average or median consumption may be used to estimate the reading for the same time of day (whether that is a particular hour, or set of hours), or the same time of day for the same day a week earlier, or the average consumption for the same time over the previous week, month, or year. In a system in which source meters are read, readings may be estimated for any missing reading from the source meters using the above methodology.

After the estimated readings are determined, the total amount of water supplied and total amount of water consumed are calculated. The difference between these two figures is the unaccounted for water, over the defined time period. While the quantity of unaccounted for water itself is a valuable piece of information, additional information can be provided from the data collected. The quantity of water consumption from estimated readings versus actual readings can be supplied. This ratio provides guidance as to the reliability of the unaccounted for water figure. For example, if less than 1% of the readings were estimated, the unaccounted for water figure would be quite reliable. However, if 30% of the readings were estimated, then the unaccounted for water figure is not particularly reliable.

In other embodiments, the profiles of water supplied, water consumed, and unaccounted for water over the defined time period can be constructed. The values for each of water supplied or consumed, and unaccounted for water are plotted versus time. The profiles are then be analyzed to determine the source of unaccounted for water. If there is a spike or surge of unaccounted for water over a limited time period, then external, known causes of water loss should be investigated. These include breakages of water lines, flushing of the system, and use by a fire department putting out fires. However, if there is no known external cause that corresponds in time to the surge of unaccounted for water, then such loss is likely due to theft. In one embodiment, profiles of consumption at individual meters may be constructed and analyzed. If consumption at a meter goes from a reasonable value to zero at the same time as the surge in unaccounted for water, and then returns to a reasonable value after the surge is over, then that pattern indicates that the meter may have been disconnected while the consumer used a large quantity of water for a one-time purpose, such as filling up a swimming pool.

Where there are no obvious spikes or surges in unaccounted for water, the profile of unaccounted for water as compared to the profile of water consumed may still reveal the cause of the unaccounted for water. If the amount of unaccounted for water varies directly with the amount of consumption, then the cause of that unaccounted for water is predominantly inaccurate meters. That is, if the quantity of unaccounted for water approaches zero when water consumption approaches zero, then increases steadily generally in proportion to an increase in consumption, this usually indicates the meters are not accurate. Such a pattern is to be contrasted with that caused by leaks.

Leaks in the distribution system tend to vary inversely with consumption. That is, when consumption is very low, the pressure in the system will be higher and relatively more water will be lost to leaks. When consumption is high, the pressure in the system will be less and relatively less water will be lost to leaks. Therefore, if the profile of unaccounted for water over the time period remains relatively constant at periods of zero or very low consumption, and remains the same or decreases as consumption increases, then the predominant cause of the unaccounted for water is likely leaks. Depending on the availability and number of source meters to measure the quantity of water flowing into and out of segments of a distribution system, the data can be broken down by segment, and leaks, inaccurate meters, or sources of theft can be isolated by analyzing profiles of supply, consumption, and unaccounted for water.

Figure 2:
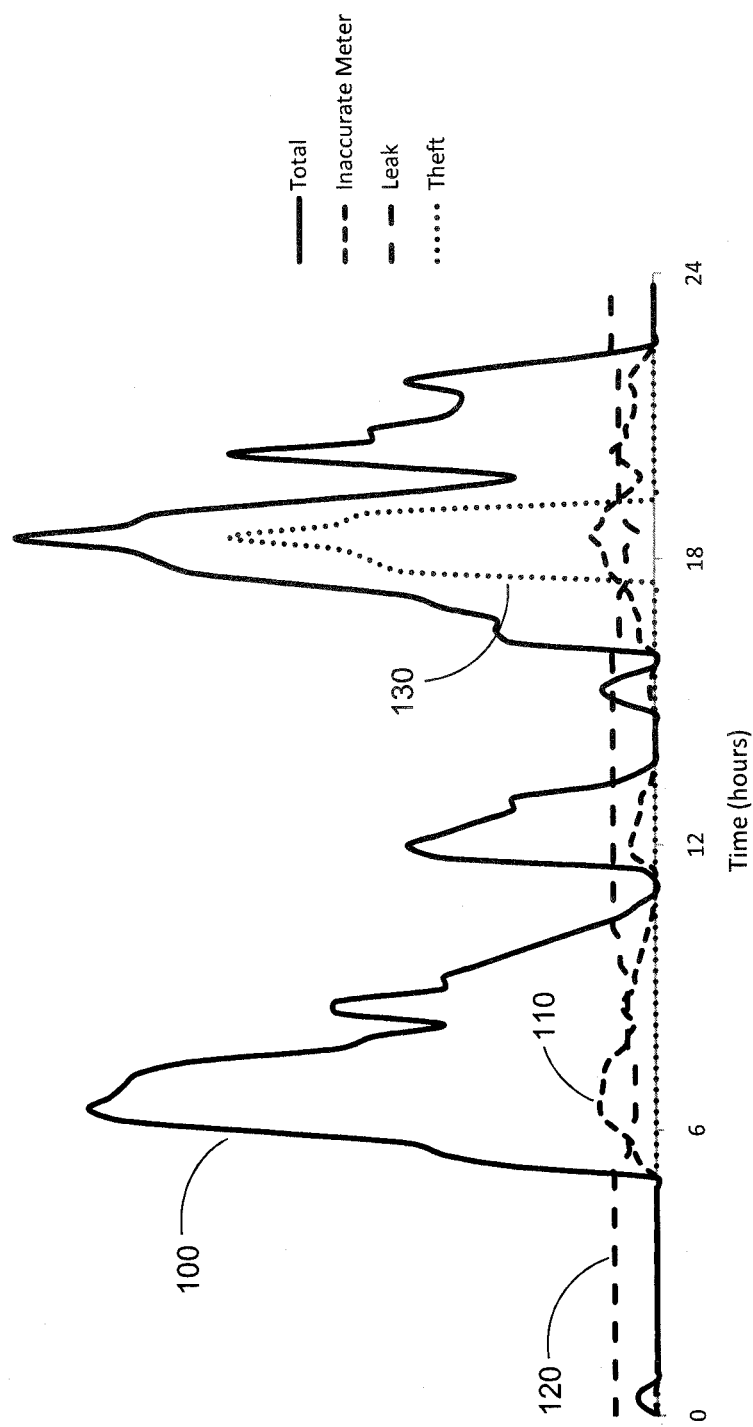
FIG. 2 illustrates exemplary water profiles showing applications of embodiments of the present invention to determine the source of unaccounted for water.
Figure 3:
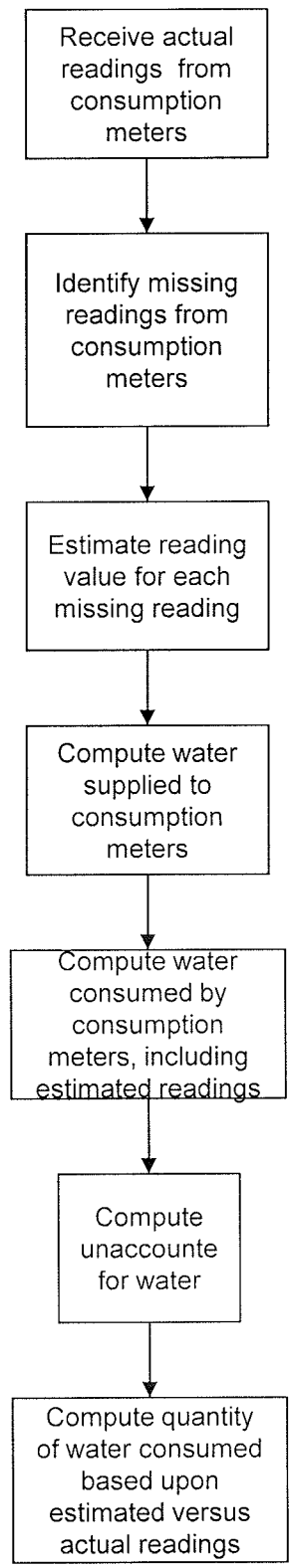
FIG. 3 is a flowchart of the steps of one embodiment of the method of the present invention.

Exemplary profiles of a consumption pattern and various unaccounted for water patterns are shown in FIG. 2. As shown in FIG. 2, the total consumption over a meter or group of meters over a 24-hour period is represented by line 100. Exemplary profiles of unaccounted for water, under various scenarios, are shown by the remaining lines. Line 110 shows a profile of unaccounted for water that varies roughly directly proportionally to the volume of consumption. This pattern indicates inaccuracies in the meters. Line 120 shows a profile of unaccounted for water that is roughly consistent, and slightly decreasing as consumption rises, and therefore when line pressure decreases. This pattern indicates a leak in line. Line 130 indicates a single large spike of unaccounted for water that coincides with a period of high consumption. This pattern indicates a theft of water.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

What is claimed is:

1. A method of determining the reliability of consumption data in a water distribution system comprising a multiplicity of consumption meters, each said consumption meter making an actual reading of said meter upon intervals and comprising a communications module for reporting said actual readings, said method comprising:
    receiving actual meter readings for said reading intervals from said consumption meters;
    identifying missing readings from any meter over a defined time period;
    estimating, for each said missing reading, an estimated reading;
    computing the water consumed by said multiplicity of meters over said time period, that is the sum of the estimated readings and the actual meter readings, to obtain a computed amount of total consumption; and
    computing a measure of reliability of the computed amount of total consumption that is a function of the ratio of the quantity of water consumption determined from actual meter readings to the quantity of water consumption determined from estimated readings.

2. The method of claim 1, further comprising:
    computing the water supplied to said multiplicity of meters over said time period;
    determining a quantity of unaccounted for water over said time period by computing the difference between an aggregate of water supplied and an aggregate of water consumed over said time period;
    building a profile of water consumed over said time period;
    building a profile of unaccounted for water over said time period; and
    comparing said consumed profile to said profile of unaccounted-for water to identify a source of said unaccounted for water.

3. The method of claim 2, wherein said comparing step comprises comparing the profile of unaccounted for water during an interval of low water consumption to the profile of unaccounted for water during an interval of high water consumption, and when the measure of reliability indicates high reliability, to determine if said unaccounted for water is due to a leak in the system.

4. The method of claim 2, comprising determining a likelihood of theft if a surge in the profile of unaccounted-for water occurs during a period when the consumed profile drops to zero, and the measure of reliability indicates high reliability.

5. The method of claim 2, comprising determining a likelihood of meter inaccuracy if the amount of unaccounted-for water shown in the profile of unaccounted-for water varies directly with the amount of consumption shown in the consumed profile, and the measure of reliability indicates high reliability.

6. The method of claim 1, comprising: computing the water supplied to said multiplicity of meters over said time period; and determining the quantity of unaccounted for water over said time period by computing the difference between an aggregate of water supplied and an aggregate of water consumed over said time period.

7. The method of claim 1, comprising reporting the quantity of water consumed based upon actual readings versus the quantity of water consumed based upon estimated readings.

8. A method of determining the reliability of consumption data of a resource in a distribution system comprising a multiplicity of consumption meters, each said consumption meter making an actual reading of said meter upon intervals and comprising a communications module for reporting said actual readings, said method comprising:
    receiving actual meter readings for said reading intervals from said consumption meters;
    identifying missing readings from any meter over a defined time period;
    estimating, for each said missing reading, an estimated reading of said corresponding meter;
    computing the quantity of resource consumed by said multiplicity of meters over said time period, that is the sum of consumption determined from estimated readings and the actual meter readings, to obtain a computed amount of total consumption; and
    computing a measure of reliability of the computed amount of total consumption that is a function of the ratio of the quantity of consumption determined from actual meter readings and the quantity of consumption determined from estimated readings.

9. The method of claim 8, further comprising:
    computing the quantity of resource supplied to said multiplicity of meters over said time period;
    determining a quantity of unaccounted for resource over said time period by computing the difference between an aggregate of resource supplied and an aggregate of resource consumed over said time period;

building a profile of resource consumed over said time period;

building a profile of unaccounted for resource over said time period; and comparing said consumed profile to said profile of unaccounted-for resource to identify a source of said unaccounted for resource.

10. The method of claim 9, wherein said comparing step comprises comparing the profile of unaccounted for resource during an interval of low consumption to the profile of unaccounted for water during an interval of high consumption, and the measure of reliability indicates high reliability, to determine if said unaccounted for resource is due to a leak in the system.

11. The method of claim 8, comprising computing the quantity of resource supplied to said multiplicity of meters over said time period.

12. The method of claim 8, comprising: computing the quantity of resource supplied to said multiplicity of meters over said time period; and determining the quantity of unaccounted for resource over said time period by computing the difference between an aggregate of resource supplied and an aggregate of resource consumed over said time period.

13. The method of claim 8, wherein the measure of reliability is a function of the quantity of resource consumed based upon actual readings versus the quantity of resource consumed based upon estimated readings.

14. The method of claim 8, comprising determining a likelihood of theft if a surge in the profile of unaccounted-for water occurs during a period when the consumed profile drops to zero, and the measure of reliability indicates high reliability.

15. The method of claim 8, comprising determining a likelihood of meter inaccuracy if the amount of unaccounted-for water shown in the profile of unaccounted-for water varies directly with the amount of consumption shown in the consumed profile, and the measure of reliability indicates high reliability.

16. A method of generating an estimate of the amount of an unaccounted-for resource in a distribution system comprising a multiplicity of consumption meters and providing a measure of the reliability of the estimate, each said consumption meter making an actual reading of said meter upon intervals and comprising a communications module for reporting said actual readings, said method comprising:

receiving actual meter readings for said reading intervals from said consumption meters;

identifying missing readings from any meter over a defined time period;

estimating, for each said missing reading, an estimated reading of said corresponding meter;

computing the quantity of resource supplied to said multiplicity of meters over said time period;

computing the quantity of resource consumed by said multiplicity of meters over said time period, which is the sum of consumption determined from estimated readings and the actual meter readings, to obtain a computed amount of total consumption;

determining the quantity of unaccounted for resource over said time period by computing the difference between an aggregate of resource supplied and an aggregate of resource consumed over said time period; and computing a measure of reliability of the computed amount of total consumption that is a function of the ratio of the quantity of consumption determined from actual meter readings and the quantity of consumption determined from estimated readings.

* * * * *

UNITED STATES PATENT AND TRADEMARK OFFICE
CERTIFICATE OF CORRECTION

| | | |
|---|---|---|
| PATENT NO. | : 9,228,853 B1 | Page 1 of 1 |
| APPLICATION NO. | : 13/532251 | |
| DATED | : January 5, 2016 | |
| INVENTOR(S) | : William J. Brennan, Jr. | |

It is certified that error appears in the above-identified patent and that said Letters Patent is hereby corrected as shown below:

Title page, item (75) Inventor should read: William J. Brennan, Jr.

Signed and Sealed this
Nineteenth Day of April, 2016

Michelle K. Lee
*Director of the United States Patent and Trademark Office*